United States Patent
Turnbull et al.

(10) Patent No.: US 11,729,232 B2
(45) Date of Patent: Aug. 15, 2023

(54) CONTENT DELIVERY

(71) Applicant: BRITISH TELECOMMUNICATIONS PUBLIC LIMITED COMPANY, London (GB)

(72) Inventors: Rory Turnbull, London (GB); Timothy Stevens, London (GB); Stephen Appleby, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/019,362

(22) PCT Filed: Aug. 6, 2021

(86) PCT No.: PCT/EP2021/071994
§ 371 (c)(1),
(2) Date: Feb. 2, 2023

(87) PCT Pub. No.: WO2022/037972
PCT Pub. Date: Feb. 24, 2022

(65) Prior Publication Data
US 2023/0216905 A1 Jul. 6, 2023

(30) Foreign Application Priority Data
Aug. 19, 2020 (GB) ...................... 2012951

(51) Int. Cl.
*H04L 65/611* (2022.01)
*H04L 67/02* (2022.01)
*H04L 65/612* (2022.01)

(52) U.S. Cl.
CPC .......... *H04L 65/611* (2022.05); *H04L 65/612* (2022.05); *H04L 67/02* (2013.01)

(58) Field of Classification Search
CPC ... H04L 65/611; H04L 67/02; H04N 21/6433; H04N 21/22
See application file for complete search history.

(56) References Cited

U.S. PATENT DOCUMENTS 6,574,795 B1   6/2003   Carr
6,973,667 B2   12/2005  Fritsch
(Continued)

FOREIGN PATENT DOCUMENTS

CN   103004133   3/2013
CN   106464932   2/2017
(Continued)

OTHER PUBLICATIONS

"3GPP TS 23.246", 3rd Generation Partnership Project; Technical Specification Group Services and System Aspects; Multimedia Broadcast/Multicast Service (MBMS); Architecture and functional description (Release 16), V16.1.0, Sep. 2019, 77 pages.
(Continued)

*Primary Examiner* — Chirag R Patel
(74) *Attorney, Agent, or Firm* — Nixon & Vanderhye P.C.

(57) ABSTRACT

Described is a method of delivery of content to a client device. In particular, the method can be applied to hybrid unicast/multicast delivery networks, where content is provided by a content server to a root proxy, and that root proxy delivers the content to edge proxies over multicast. However, requests for that content in the form of HTTP GET requests from a client device are received by an edge proxy, which subsequently sends an HTTP HEAD request for header information associated with that content directly to the content server. The content server responds over unicast with a suitable response to the HTTP HEAD request, which is received by the edge proxy. The edge proxy takes the response together with the payload from the content segment
(Continued)

received over multicast, to generate a client specific content segment for delivery to the client device over unicast.

9 Claims, 4 Drawing Sheets

(56) References Cited

U.S. PATENT DOCUMENTS

| | | | |
|---|---|---|---|
| 7,404,201 | B2 | 7/2008 | Takeuchi |
| 8,713,195 | B2 | 4/2014 | Pickens |
| 9,059,916 | B2 | 6/2015 | Hwang |
| 9,380,091 | B2 | 6/2016 | Bao |
| 9,673,996 | B1 | 6/2017 | Upadhyay |
| 9,871,666 | B2 | 1/2018 | Hennig |
| 10,129,855 | B1 | 11/2018 | Naim |
| 10,257,077 | B1 | 4/2019 | Zhu |
| 10,412,343 | B2 | 9/2019 | Kwan |
| 10,972,761 | B2 | 4/2021 | Ra |
| 11,343,348 | B1 * | 5/2022 | Stevens ................ H04L 67/568 |
| 2002/0118689 | A1 | 8/2002 | Luijten |
| 2002/0124262 | A1 | 9/2002 | Basso |
| 2004/0078624 | A1 | 4/2004 | Maxemchuk |
| 2006/0143669 | A1 | 6/2006 | Cohen |
| 2007/0107026 | A1 | 5/2007 | Sherer |
| 2010/0043022 | A1 | 2/2010 | Kaftan |
| 2011/0239262 | A1 | 9/2011 | Yang |
| 2012/0072901 | A1 | 3/2012 | Hessenauer et al. |
| 2012/0170578 | A1 | 7/2012 | Anumala et al. |
| 2012/0259994 | A1 | 10/2012 | Gillies |
| 2013/0124683 | A1 | 5/2013 | Watanabe et al. |
| 2014/0282777 | A1 | 9/2014 | Gonder |
| 2015/0207838 | A1 | 7/2015 | Gabin et al. |
| 2016/0269794 | A1 | 9/2016 | Shimura |
| 2016/0323348 | A1 | 11/2016 | Bradbury et al. |
| 2016/0380890 | A1 | 12/2016 | Hennig et al. |
| 2017/0063684 | A1 | 3/2017 | Stokking |
| 2017/0118263 | A1 | 4/2017 | Crabtree |
| 2017/0127147 | A1 | 5/2017 | Crabtree |
| 2019/0191212 | A1 | 6/2019 | Sljivic et al. |
| 2022/0141542 | A1 | 5/2022 | Stevens et al. |
| 2022/0141543 | A1 | 5/2022 | Turnbull et al. |

FOREIGN PATENT DOCUMENTS

| | | |
|---|---|---|
| CN | 107257268 | 10/2017 |
| EP | 1 398 938 | 3/2004 |
| EP | 2 597 824 | 5/2013 |
| EP | 2 695 326 | 2/2014 |
| EP | 3 127 334 | 2/2017 |
| GB | 2583020 | 10/2020 |
| JP | 2018-129599 | 8/2018 |
| WO | 2012/138909 | 10/2012 |
| WO | 2015/150737 | 10/2015 |
| WO | 2016/107733 | 7/2016 |
| WO | 2018/073317 | 4/2018 |
| WO | 2018/097827 | 5/2018 |
| WO | 2020/173878 | 9/2020 |
| WO | 2020/173984 | 9/2020 |
| WO | 2022037972 A1 | 2/2022 |

OTHER PUBLICATIONS

"Adaptive media streaming over IP multicast", DVB BlueBook, Document A176 (Second Edition), Mar. 2020, 110 pages.
"IP Multicast Adaptive Bit Rate Architecture Technical Report", Video IP Multicast, OC-TR-IP-MULTI-ARCH-C01-161026, Oct. 26, 2016, 69 pages.
Csaba Okrona, "What is a HTTP HEAD Request Good for? Some Uses (/httphead-request-good-uses/)", Wikipedia, Aug. 27, 2011, 3 pages, https //ochronus.com/http-head-request-good-uses/.
Combined Search and Examination Report for GB Application No. 2012951.6 dated Dec. 21, 2020, 6 pages.
International Search Report and Written Opinion of the ISA for PCT/EP2021/071994 dated Nov. 2, 2021, 14 pages.
Office Action dated Dec. 26, 2022, issued for Chinese Application No. 202080016552.5 (9 pages).
Office Action dated Dec. 2, 2022, issued for Chinese Application No. 202080016920.6 (12 pages).
U.S. Appl. No. 17/433,414, filed Aug. 24, 2021, Multicast Assisted Delivery.
U.S. Appl. No. 18/019,362, filed Feb. 2, 2023, Content Delivery.
Office Action dated Mar. 28, 2023 issued in U.S. Appl. No. 17/433,414 (18 pages).
Combined Search and Examination Report dated Dec. 21, 2020 issued in GB Application No. GB2012951.6 (6 pages).
Cabellabs, IP Multicast Adaptive Bit Rate Architecture Technical Report, V01 Oct. 26, 2016, Document Control No. OC-TR-IP-MULTI-ARCH-C01-161026 (69 pages).
3GPP TS 23.246 V16.1.0 (Sep. 2019) Multimedia Broadcast/Multicast Service (MBMS); Architecture and functional description (Release 16); 2019 (77 pages).
Adaptive media streaming over IP multicast DVB Document A176 (Second edition) Mar. 2020 (110 pages).
International Search Report for PCT/EP2020/054777 dated May 12, 2020, 3 pages.
Written Opinion of the ISA for PCT/EP2020/054777 dated May 12, 2020, 6 pages.
Search Report for EP19159748.3 dated Apr. 9, 2019, 8 pages.
Combined Search and Examination Report for GB1902640.0 dated Aug. 16, 2019, 6 pages.
Search Report for GB2002565.6 dated Jul. 13, 2020, 5 pages.
International Search Report and Written Opinion of the ISA for PCT/EP2020/054993 dated May 12, 2020, 12 pages.
International Preliminary Report on Patentability dated Sep. 10, 2021 issued for PCT/EP2020/054777 (8 pages).
Csaba Okrona: "What is a HTTP HEADRequest Good for? Some Uses", Aug. 27, 2011 (Aug. 27, 2011), XP055139472,Retrieved from the Internet:URL:https://ochronus.com/http-head-request-good-uses/[retrieved on Sep. 10, 2014]the whole document (3 pages).
Office Action dated Aug. 18, 2022, issued for U.S. Appl. No. 17/433,414 (13 pages).

* cited by examiner

CONTENT DELIVERY

CROSS-REFERENCE TO RELATED APPLICATIONS

This application is the U.S. national phase of International Application No. PCT/EP2021/071994 filed Aug. 6, 2021 which designated the U.S. and claims priority to GB Patent Application No. 2012951.6 filed Aug. 19, 2020, the entire contents of each of which are hereby incorporated by reference.

FIELD OF THE INVENTION

This invention relates to the field of content delivery using a combination of unicast and multicast.

BACKGROUND TO THE INVENTION

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed $15^{th}$ June) without football, and plot 104 shows the traffic volumes the following day (Thu $16^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such requests/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the available network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-C01-161026, 26/10/2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8 Mar. 2018). These hybrid solutions can be used for multicast adaptive bit rate (mABR) delivery of content.

FIG. 2 shows a generalised example of such hybrid solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as client, and independently makes requests for content segments and dispatches the entire response into the multicast network. Proxy X does this by first requesting a manifest file and then making timely requests for the content segments described within it. All the client devices will receive identical responses to their requests for segments, as the same multicast content is received by all the Proxy Ys from Proxy X. Note, the Proxy Ys can be located within the client devices, or separate devices or there may be just a single Proxy Y dependent on set-up.

This mechanism does not allow client devices to send client or session-specific information to the content server, and also makes it impossible for the responses sent to the client devices to contain client or session-specific information from the content server. Session-specific information could include authentication tokens, URL signatures, cookies or status information such as the current play point.

Furthermore, the content server is typically a CDN edge cache which would otherwise have visibility of the number of requests being made and the number of responses it is serving. This information is used for service monitoring, metering and analytics, and is often crucial to the CDN operator's business e.g. for service assurance, billing, etc.

With the hybrid multicast architecture outlined above, regardless of the number of client devices consuming content, here is only a single request made by the Proxy X and a corresponding single response from the content server. This clearly presents problems for the content provider in trying to determine the real demand for its content.

Many other unicast-multicast hybrid arrangements, and mABR solutions in general, suffer from similar problems.

SUMMARY OF THE INVENTION

It is the aim of examples of the present invention to provide an improved content delivery mechanism.

According to one example of the invention, there is provided a method of delivering content to a client device in a network comprising a plurality of client devices, wherein said content comprises a sequence of segments, said method comprising:
i) receiving at a first network element one or more segments from a content server sent over multicast;

ii) receiving at the first network element a request for a segment from a client device, wherein the request comprises an HTTP GET request;

iii) responsive to the received request, sending by the first network element a HTTP HEAD request to the content server;

iv) receiving a response to the HTTP HEAD request at the first network element over unicast;

v) generating a segment comprising the header from the received response and a payload from one of the one or more received segments;

vi) sending the generated segment to the client device over unicast.

The HTTP HEAD request effectively corresponds to the HTTP GET request. The HTTP HEAD request may comprise session specific information. The response to the HEAD request may also comprise session specific information. The HTTP HEAD request may be sent directly to the content server.

The header and payload may be matched using an identifier associated with the header and a corresponding identifier associated with the payload.

One or more segments may be cached at the first network element.

The response to the HEAD request may not contain a payload portion.

The content may be video content.

According to another example of the invention, there is provided a network element for managing content delivery over a network to a client device, said network element adapted in operation to:

receive one or more segments from a content server sent over multicast;

receive a request for a segment from a client device, wherein the request comprises an HTTP GET request;

send, responsive to the received request, a HTTP HEAD request to the content server;

receiving a response to the HTTP HEAD request over unicast;

generate a segment comprising the header from the received response and a payload from one of the one or more received segments;

send the generated segment to the client device over unicast.

In examples of the invention, client devices are advantageously able to share session specific information with content servers, such as authentication tokens, URL signatures, cookies, and status information. The content servers are also made aware of individual client devices as a result of the HTTP HEAD requests received, and thus are able to provide analytics and billing information.

Note, the headers in the responses to the HEAD requests are typically much smaller than the payloads in the multicast segments, so despite the use of HEAD requests and responses, there are still significant bandwidth savings through the use of multicast for the payloads.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of delivery of content to a client device. In particular, examples can be applied to hybrid unicast/multicast delivery networks, where content is provided by a content server to a root proxy, and that root proxy delivers the content to edge proxies over multicast. However, requests for that content in the form of HTTP GET requests from a client device are received by an edge proxy, which subsequently sends an HTTP HEAD request for header information associated with that content directly to the content server. The content server responds over unicast with a suitable response to the HTTP HEAD request, which is received by the edge proxy. The edge proxy takes the response together with the payload from the content segment received over multicast, to generate a client specific content segment for delivery to the client device over unicast.

Figure 1:
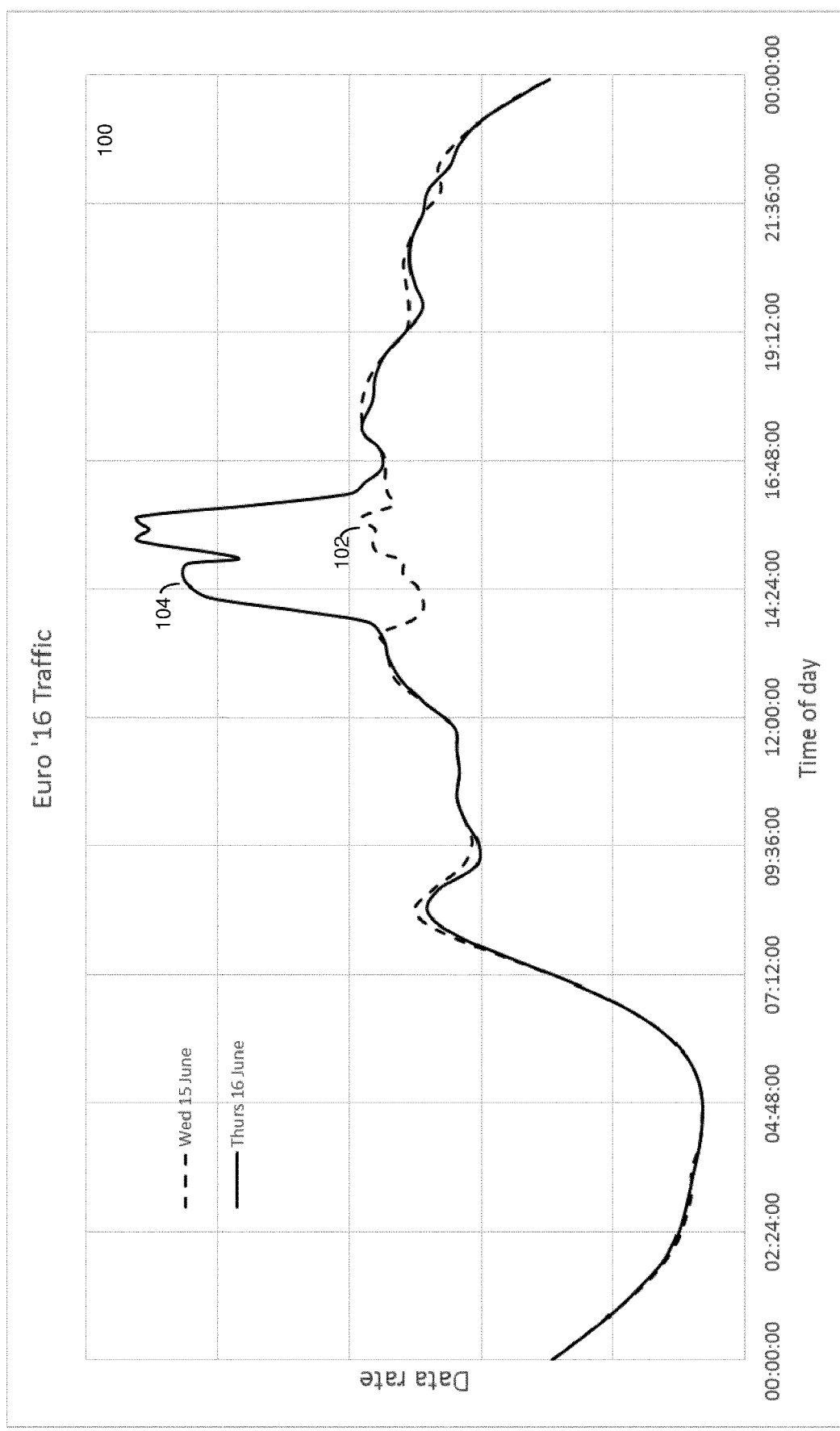
FIG. 1 is a graph showing traffic volume over a network on different days.
Figure 2:
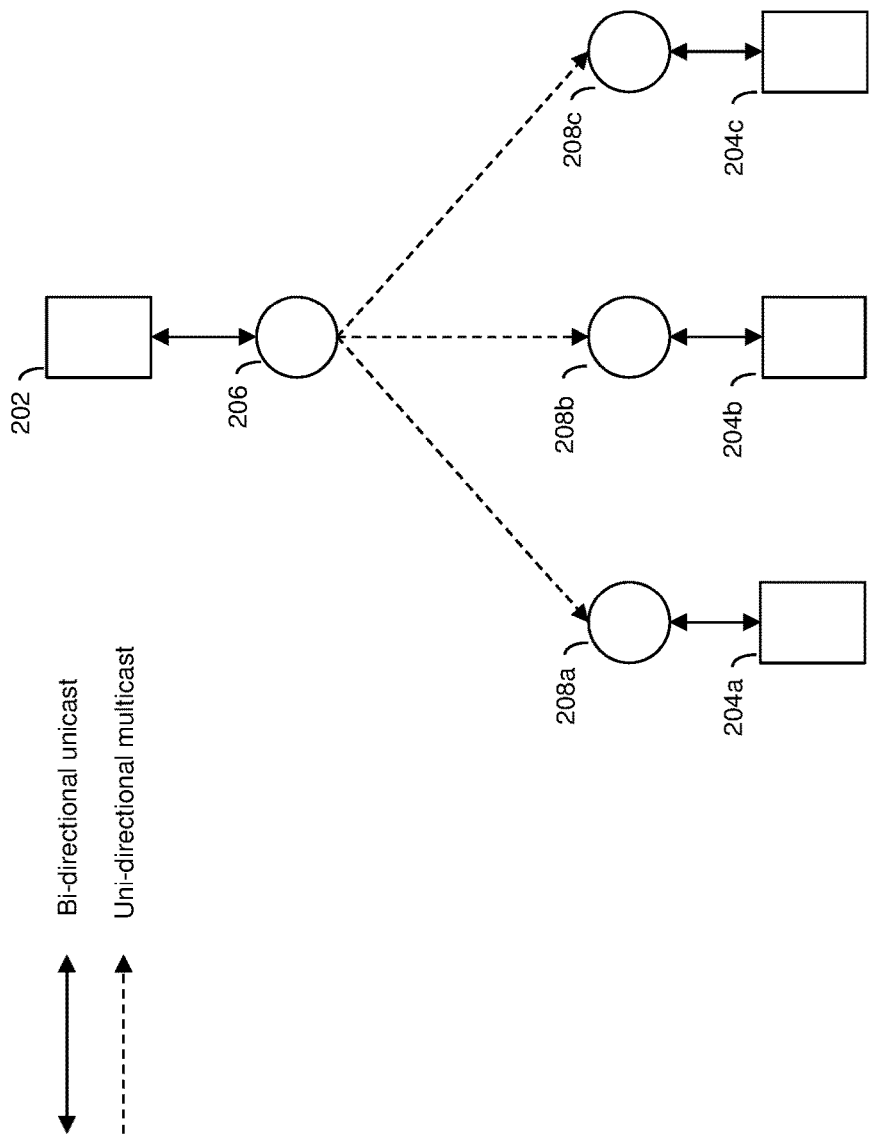
FIG. 2 is a network diagram of a general prior solutions.
Figure 3:
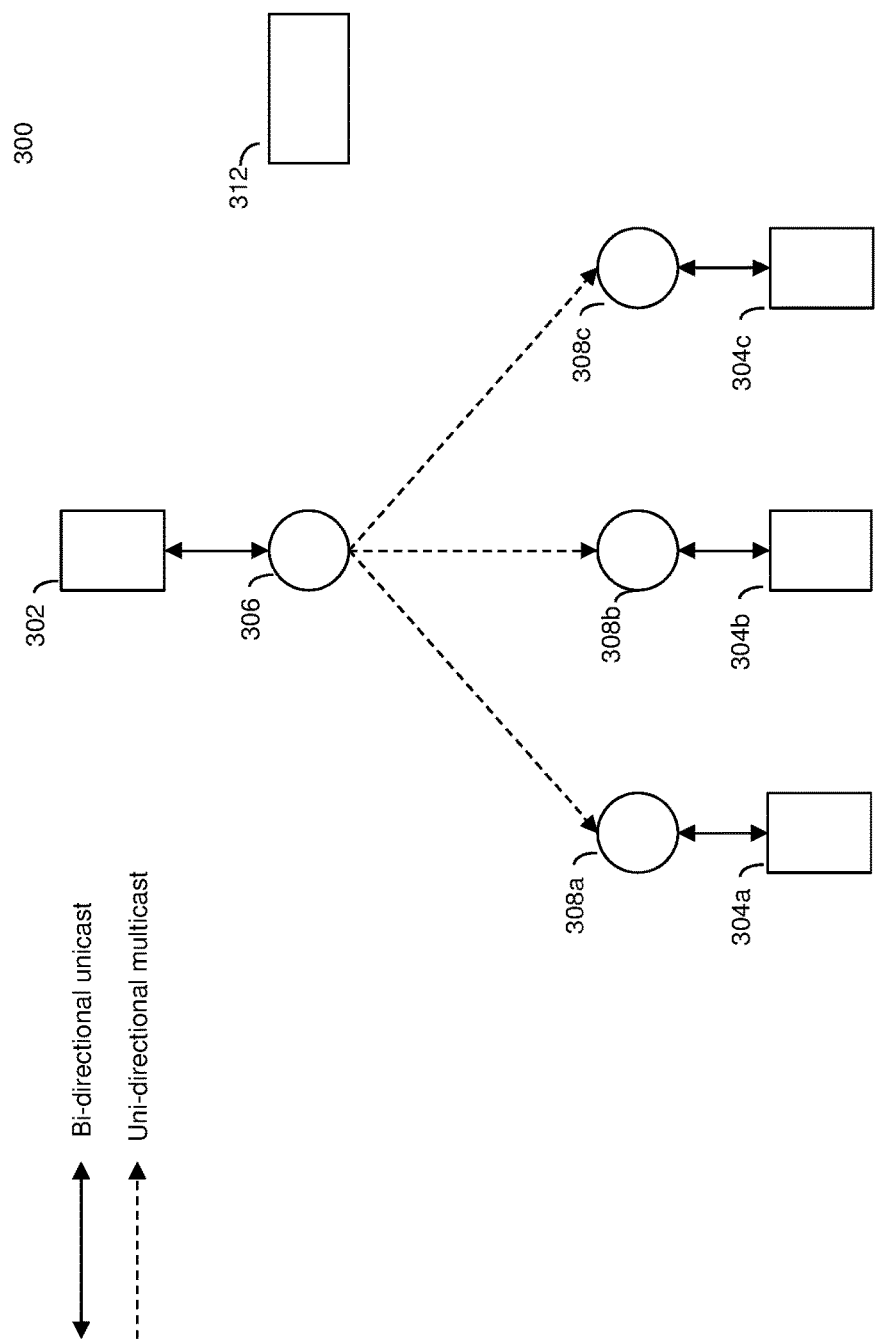
FIG. 3 is a network diagram showing in operation the main components of an example of the present invention.

FIG. 3 shows the main components of an example of the present invention. The components mirror those in the hybrid solutions as exemplified in FIG. 2. However, as will become apparent from the description that follows, the operation of some of the components differ.

Returning to FIG. 3, the network 300 comprises a content server 302, a Proxy X 306 (also referred to as a root proxy), Proxy Ys (also referred to as edge proxies) 308a, 308b, and 308c, client devices 304a, 304b and 304c, and a multicast controller 312. The multicast controller 112 can assist with the operation of Proxy X 306 and the Proxy Ys. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over multicast. The Proxy Ys can be located within the client devices, in separate devices (such as a home gateway), or there may be a single Proxy Y dependent on set-up.

The client devices are assumed to be running respective client applications, which are the source of content requests. For simplicity, the term client device from hereon in is used to refer to a client device running a client application. The client devices can make HTTP (or HTTPS) unicast requests for content held at the content server 302.

The content held at the content server 302 is typically media content (e.g. a TV programme, film or an entire linear TV channel) comprising video sequences encoded according a suitable standard such as the ITU H.264 standard. The video sequences are stored in the form of sequential temporal segments at the content server 302, where each segment is typically equivalent to 2 to 10 seconds of decoded video. The video sequences may also be encoded at a plurality of bit rates or quality levels, resulting in a plurality of encoded sequences, each encoded at one of a plurality of bit rates. Such an arrangement is typical of an adaptive bit rate streaming service.

Manifest files are used by clients to identify where segments are located (by a URL in the manifest). Thus, a client device streams a video sequence by using the manifest to determine where to direct sequential unicast requests for each segment, at a particular bit rate, in turn as required. Such an arrangement is used in HTTP Adaptive Streaming technologies such as MPEG-DASH and Apple's HLS (HTTP Live Streaming).

Whilst the content server 302 and Proxy X 306 are shown here as two separate entities, in some arrangements the two entities could be co-located or their functionality be provided by a single server.

The multicast controller 312 (MCC) monitors the operation of Proxy X and the Proxy Ys, and can control the proxies accordingly.

Thus, the network 300 is arranged so that Proxy X 306 is effectively operating at the root of a multicast tree, requesting content from the content server over unicast, and packaging the received content for multicast transmission to the Proxy Ys. The Proxy Ys are at the edge of the multicast tree, receiving the content from Proxy X over multicast and locally caching it (if appropriate). Client devices can make HTTP GET requests for content from a suitable Proxy Y.

Examples of the present invention set out how those HTTP GET requests are handled in a manner that enables client specific information to pass from a client device to the content server, and vice versa, whilst still advantageously using the multicast delivery mechanism provided between Proxy X and the Proxy Ys.

Figure 4:
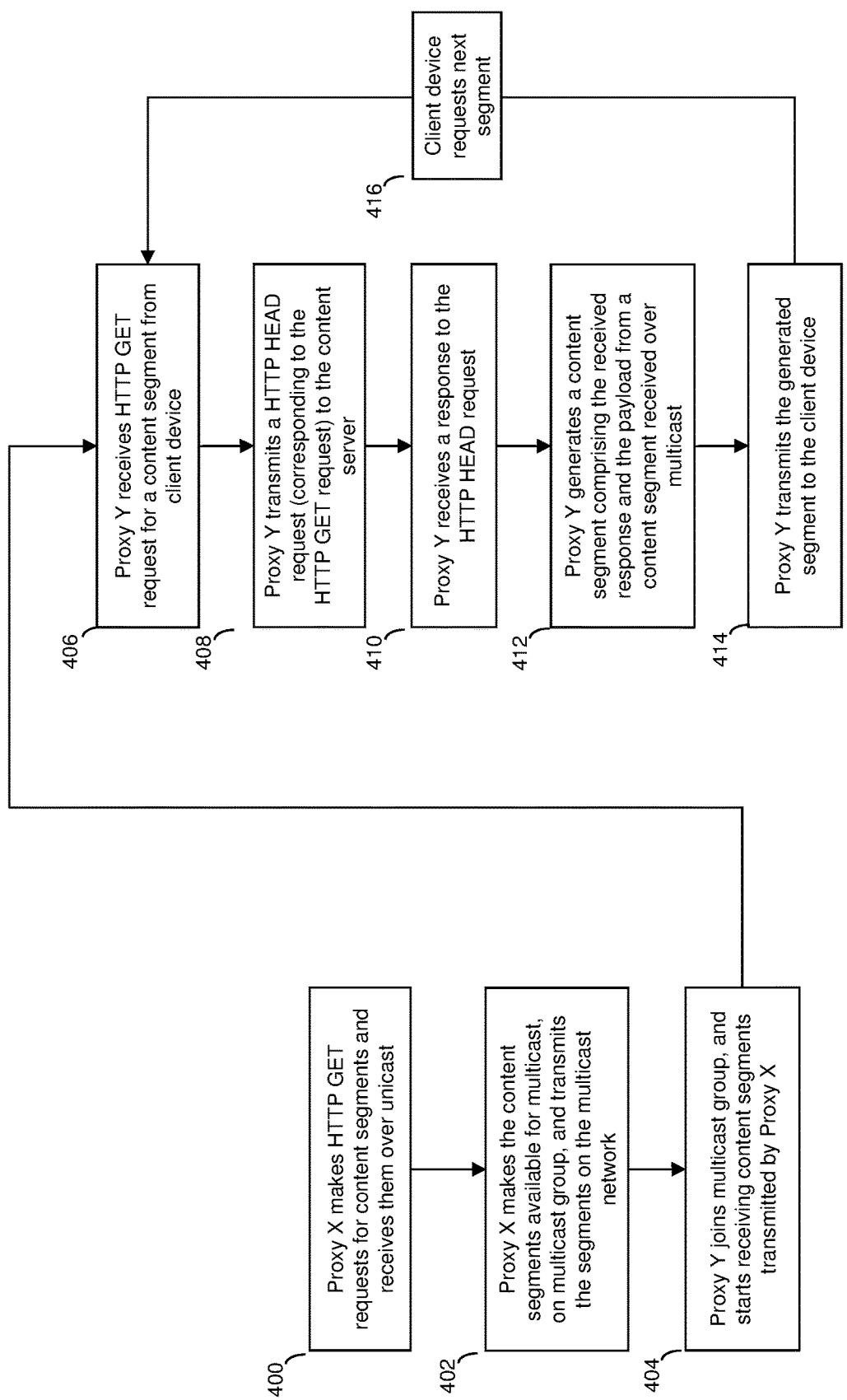
FIG. 4 is a flow chart summarising the steps of an example of the invention.

FIG. 4 shows a flow chart summarising the steps of the operation of the elements in FIG. 3 in an example of the invention.

Starting at step 400, Proxy X 306 starts making HTTP GET requests for content segments from content server 302. The content may be for example a live football match. To do this, Proxy X 306 can first obtain the manifest file associated with the content, and makes requests for content segments detailed in the manifest. These requests are typically HTTP GET requests, which are unicast in nature, with a request made for each content segment. The content server 302 responds by sending the requested content segment in an HTTP response to Proxy X 306. The manifest is regularly updated with details of any new content segments, and thus Proxy X continues to request subsequent content segments until there are no more segments listed in the manifest.

In step 402, Proxy X 306 makes the content segments it has received available on multicast. This can start as soon as Proxy X 306 has received the first content segment. Proxy X 306 can already have been set-up (for example, under the instruction of the multicast controller 312) so that certain content received from the content server 302 is transmitted over multicast to the Proxy Ys. For example, each programme can be put on a different multicast channel, defined by its own IP address. The presence of a new programme and the multicast channel can be broadcast to potential recipients, such as the Proxy Ys, using standard techniques. Proxy X 308 packages the received content segments for multicast transmission, and transmits the content segments over multicast.

Now the next steps are described with reference to Proxy Y 308a and associated client device 304a, though it will be appreciated that other Proxy Ys (and associated client devices) can additionally or alternatively be subject to the same method.

In step 404, Proxy Y 308a joins the multicast group on which Proxy X 306 is transmitting the content segments in step 402. This may be initiated in advance, for example under instruction from the multicast controller or in response to a request for the same content from an associated client device, such as client device 304a. Once the multicast group has been joined, Proxy Y 308a starts receiving content segments transmitted over multicast by Proxy X. These received content segments may be cached at Proxy Y 308a.

Under normal operation, a client device such as client device 304a would make sequential unicast requests for the content segments received by Proxy Y 308a in step 404, and then decode and playout the content as normal. However, examples of the invention modify the normal operation as set out in steps 406 to 414 below.

In step 406, Proxy Y 308a receives an HTTP GET request for a content segment from client device 304a. The client device 304a uses a suitable manifest to determine where to direct HTTP GET requests for content segments.

In step 408, Proxy Y 308a determines that the requested content segment is one that it has received (in step 404). However, instead of responding with the requested content segment, Proxy Y 308a modifies the HTTP GET request to a corresponding HTTP HEAD request, and transmits that corresponding HTTP HEAD request over unicast to the content server 302. The HTTP HEAD request is identical to the HTTP GET request except the responding party must not return a message body, that is to say in this example, the content server must not return the content segment being requested.

The HTTP HEAD request can include session specific information allowing the content server 302 to authenticate the request and log it for subsequent analytics and billing. For example, a client device may have to log-in to the content server with username/security credentials, resulting in a security token being provided to the client device, which the client device then needs to include in subsequent segments requests (GET and HEAD).

Furthermore, both HTTP GET and HEAD requests contain the sender's public IP address. The content server can use this IP address to decide whether or not to permit streaming of the content e.g. only from UK-based IP addresses.

The HTTP HEAD request is sent by Proxy Y 308a directly to the content server 302. In alternative examples, the request may be sent via Proxy X 306, with Proxy X 306 then forwarding the request onto the content server 302.

The content server 302 receives the HTTP HEAD request, and responds accordingly with a 200 OK message sent over unicast. The 200 OK response includes only a header, and does not have a payload, as is required for responses to HTTP HEAD requests. The response header can also contain session-specific information. Proxy Y 308a receives the response message transmitted by the content server in step 410.

In step 412, Proxy Y matches the received HEAD response with the corresponding payload received over multicast (from step 404). Proxy Y substitutes the generic header received from the multicast segment with the session specific header received over unicast from the HEAD response, thus generating a session-specific content segment.

This generated content segment is transmitted over unicast to the client device 304a in step 414.

The client device 304a can decode and playback this content segment, or buffer it for decoding and playback later, depending on the configuration of the client device 304a.

Then in step 416, the client device can make a request for the next content segment in the sequence from Proxy Y 308a, and so processing loops back to step 406, and the method repeats until the client device chooses to stop or until all the content is received.

The matching of headers and payloads could be achieved by several methods.

Proxy X could label the segments pushed over multicast with the corresponding request URL, allowing Proxy Y to match the responses in its cache with the requests made by client devices.

Alternatively, Etags (Entity Tags) could be used. Etags are part of the HTTP 1.1 specification and are used to uniquely identify response payloads). The Etag will be present in both the generic header received over multicast and the session-specific header received over unicast by Proxy Y, and thus corresponding Etags can be used to match up payloads with the correct headers.

Other (custom) labelling schemes could be employed with the content server 302 placing additional headers in the responses to both the Proxy X and the Proxy Ys for the purposes of facilitating the match.

Whilst the above examples have been described with reference to HTTP GET and HTTP HEAD requests, other message types and protocols could be used that have same function.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of delivering content to a client device in a network comprising a plurality of client devices, wherein said content comprises a sequence of segments, said method comprising:
   i) receiving at a first network element one or more segments from a content server sent over multicast;
   ii) receiving at the first network element a request for a segment from a client device, wherein the request comprises an HTTP GET request;
   iii) responsive to the received request, sending by the first network element a HTTP HEAD request to the content server;
   iv) receiving a response to the HTTP HEAD request at the first network element over unicast;
   v) generating a segment comprising the header from the received response and a payload from one of the one or more received segments;
   vi) sending the generated segment to the client device over unicast.

2. A method according to claim 1, wherein said HTTP HEAD request corresponds to the HTTP GET request.

3. A method according to claim 1, wherein in step v), the header and payload are matched using an identifier associated with the header and a corresponding identifier associated with the payload.

4. A method according to claim 1, wherein said HTTP HEAD request comprises session specific information.

5. A method according to claim 1, wherein said response comprises session specific information.

6. A method according to claim 1, wherein the HTTP HEAD request is sent directly to the content server.

7. A method according to claim 1, wherein the one or more segments are cached at the first network element.

8. A method according to claim 1, wherein the response does not contain a payload portion.

9. A network element for managing content delivery over a network to a client device, said network element adapted in operation to:
   receive one or more segments from a content server sent over multicast;
   receive a request for a segment from a client device, wherein the request comprises an HTTP GET request;
   send, responsive to the received request, a HTTP HEAD request to the content server;
   receiving a response to the HTTP HEAD request over unicast;
   generate a segment comprising the header from the received response and a payload from one of the one or more received segments;
   send the generated segment to the client device over unicast.

* * * * *